(12) United States Patent
Storms et al.

(10) Patent No.: US 9,639,655 B2
(45) Date of Patent: May 2, 2017

(54) IMPORTATION AND REPRESENTATION OF PART FAMILIES AND DYNAMIC PART CATALOG GENERATION

(75) Inventors: Craig Storms, West Hartford, CT (US); Christian Tillich, Vienna (AT); Thord Backe, Hopkinton, NH (US); Felix Beer, Baden bei Wien (AT); Michael Appolo, III, Manchester, NH (US); Nick Liu, Shanghai (CN); Damian Wilcox, Calgary (CA)

(73) Assignee: Autodesk, Inc., San Rafael, CA (US)

( * ) Notice: Subject to any disclaimer, the term of this patent is extended or adjusted under 35 U.S.C. 154(b) by 790 days.

(21) Appl. No.: 13/433,176

(22) Filed: Mar. 28, 2012

(65) Prior Publication Data

US 2012/0303334 A1 Nov. 29, 2012

Related U.S. Application Data

(60) Provisional application No. 61/491,143, filed on May 27, 2011.

(51) Int. Cl.
G06F 17/50 (2006.01)

(52) U.S. Cl.
CPC ...... *G06F 17/5086* (2013.01); *G06F 2217/34* (2013.01)

(58) Field of Classification Search
CPC . G06F 17/5086; G06F 17/509; G06F 2217/34
See application file for complete search history.

(56) References Cited

U.S. PATENT DOCUMENTS

| 5,838,328 | A | * | 11/1998 | Roller | 345/420 |
| 6,782,305 | B2 | * | 8/2004 | Liteplo | G06F 17/50 700/105 |
| 8,280,696 | B1 | * | 10/2012 | Aarstein et al. | 703/1 |
| 2002/0130869 | A1 | * | 9/2002 | Camiener | G06F 17/50 345/440 |
| 2003/0065413 | A1 | * | 4/2003 | Liteplo | G06F 17/50 700/96 |
| 2003/0128232 | A1 | * | 7/2003 | Tsuji | 345/736 |

(Continued)

OTHER PUBLICATIONS

Choi et al., Exchange of CAD Part Models Based on the Macro-Parametric Approach, Int. J. CAD/CAM, vol. 2, No. 1, pp. 13-21, 2002.*

(Continued)

*Primary Examiner* — Kamini S Shah
*Assistant Examiner* — Russ Guill
(74) *Attorney, Agent, or Firm* — Fish & Richardson P.C.

(57) ABSTRACT

Methods, systems, and apparatus, including computer programs encoded on a computer storage medium, for receiving a definition of a version of a part family comprising a plurality of parts, each part having a same shape and a different respective size, wherein the definition includes a set of parameter values for each part of the part family; storing the definition along with other versions of the part family in either a parametric or parametric-independent format; receiving a request for the part family for a particular computer-aided design system; converting a latest version to a different format that is compatible with the particular computer-aided design system; and providing the converted part family in response to the request.

15 Claims, 6 Drawing Sheets

(56) References Cited

U.S. PATENT DOCUMENTS

| | | | |
|---|---|---|---|
| 2003/0149498 A1* | 8/2003 | Rebello et al. | 700/97 |
| 2004/0148145 A1* | 7/2004 | Chen et al. | 703/2 |
| 2004/0243483 A1* | 12/2004 | Baumann | G06Q 30/06 705/26.1 |
| 2006/0005126 A1* | 1/2006 | Shapiro | 715/522 |
| 2007/0089087 A1* | 4/2007 | Connor et al. | 717/105 |
| 2009/0144042 A1* | 6/2009 | Lorenz | G06F 17/5009 703/14 |

OTHER PUBLICATIONS

Gu et al., Approach Toward Parametric Design of Typical Parts and Parts-library Based on UG, Applied Mechanics and Materials vols. 84-85 (2011) pp. 8-13.*

Li et al., Data Description Norm and Key Techniques of Web-based Parts Library, Proc. Of the 9th International Conference on Computer Supported Cooperative Work in Design, 2005.*

Pratt et al., Towards the standardized exchange of parameterized feature-based CAD models, Computer-Aided Design 37 (2005) 1251-1265.*

Wikipedia, The Free Encyclopedia, "Engineering drawing", May 4, 2011.*

"AutoCAD Mechanical 2009," 2008, AutoDesk, Inc., pp. 1-11.*

"CAD tip # 2280," downloaded from the Wayback Machine from Jan. 2, 2009, pp. 1-3.*

Junwahn Kim et al., "Data exchange of parametric CAD models using ISO 10303-108," 2007, National Institute of Standards and Technology, pp. 1-51.*

Kuang-Hua Chang et al., "Design parameterization and tool integration for CAD-based mechanism optimization," 2006, Advances in Engineering Software, vol. 37, pp. 779-796.*

"Data Exchange between CAD/CAE/CAM Systems," Aug. 7, 2010, retrieved from the Wayback Machine for http://www.engr.uvic.ca/~mech410/lectures/10b_CAD_Data_Exchange.pdf, 28 pages.*

"Open Design Specification for .dwg files Version 5.1," 2010, Open Design Alliance, 225 pages.*

* cited by examiner

IMPORTATION AND REPRESENTATION OF PART FAMILIES AND DYNAMIC PART CATALOG GENERATION

CROSS-REFERENCE TO RELATED APPLICATIONS

Under 35 U.S.C. §119, this application claims benefit of U.S. Provisional Application Ser. No. 61/491,143, filed May 27, 2011, the entire contents of which is hereby incorporated by reference.

BACKGROUND

This specification relates to computer aided design and, in particular, part family representation and utilization in computer aided design systems.

Computer-aided design (CAD) systems utilize computers to allow users to create and modify designs of physical parts, piping systems, machines, and buildings, for example. Software for CAD systems can represent three-dimensional objects using solid modeling techniques. Solid modeling techniques simulate objects using solid objects. Solid objects have parameters that behave in ways that are consistent with the physical behavior of corresponding real objects. This allows CAD systems to provide simulation, planning and verification of manufacture and assembly.

SUMMARY

Particular embodiments of the subject matter described in this specification can be implemented to realize one or more of the following advantages. Three-dimensional (3-D) piping applications can require an extensive library of 3-D parts to effectively model real world piping systems. Different CAD systems can utilize different data formats for representing 3-D pipe catalogs and pipe specifications. Implementations described herein can enable the importation of existing part families from different CAD systems so that customers can re-use their existing pipe catalogs and specifications. Various implementations provide flexibility in importing part families through different representations. Depending on the source of the part family and its parametric definition, the part family can be imported using a fixed-size part family representation or, if mapping can be defined, a parametric part family representation which preserves parametric definitions and enables further editing (adding new sizes, revising size definitions, etc.). Both part family representations can work together resulting in a design that is the same regardless of which representation was used to import the part family.

Particular embodiments of the subject matter described in this specification can be implemented to realize one or more of the following further advantages. Parametric part family geometry can be imported using a two-tier data structure yielding either mapped parametric (dynamic sizing) or fixed sized (static) geometric representations. The two-tiered representations are equivalent when modeling pipe systems in a CAD application. Both result in piping models with specific part sizes represented throughout pipe runs created by selecting and assembling a system of parts. Once imported, parametric part families provide ease in editing the family geometry by varying size parameters to change a geometric representation, or adding a new size by entering new parametric values. Fixed sized families can also be edited, but in this case direct editing or replacement of the geometry is needed to change size representations, and new graphical representations must be added to define new sizes. A common part family catalog database can be used to manage content for varied applications and usage. A common schema defines a baseline that can create varied output to deliver part family catalog content to different apps in varied formats. The common schema covers the full scope of part family content including both graphical and non-graphical definitions, as well as language support. Both parametric and fixed size (static) graphical representations are supported. By persisting a single master copy of the common database on a server, duplication of content across different products and languages is eliminated. This provides a much improved streamlined process for authoring, maintaining, and translating the content. Solid body graphics approximate the real world shape of each part. Simpler representations may be generated by utilizing the connection port positioning and vector orientation to construct single line representations and, from these, simple solid representations may be obtained by sweeping circles approximating the outer pipe diameters which match each connection port.

Further implementations can eliminate duplication of effort in creating part families and alleviate the need for redundant copies of part families in different catalogs. Users can create part families that have a data representation that is independent of CAD system-specific representations using a server-based mechanism. Users can retrieve the latest version of the part family, and optionally select which product and language preference they need.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
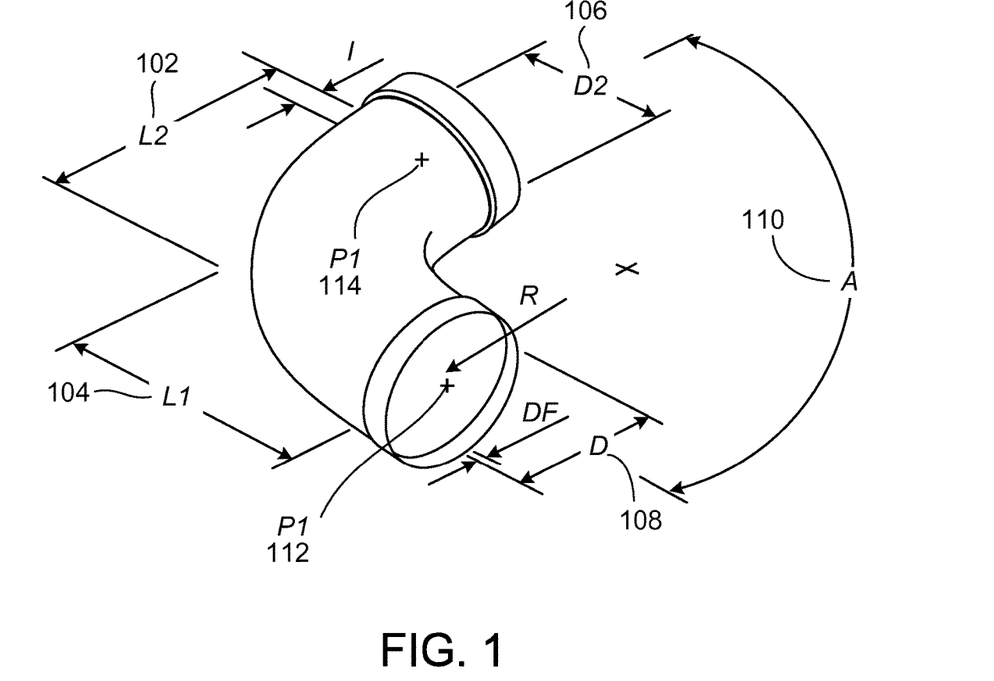
FIG. 1 is an illustration of an example part as presented in a graphical user interface by a CAD system.

FIG. 1 is an illustration of an example elbow joint part 100 as presented in a graphical user interface by a parametric CAD system. Generally speaking, a part is a solid object in a CAD system that is described by graphical and non-graphical parameters. Graphical parameters describe the size and shape of the part (i.e., the part's parametric geometry), and non-graphical parameters describe other features such as the part's material, pressure class, and so on. For example, the parameters L1 (104), L2 (102), D (108), D2 (106), and A (110) are graphical parameters of the elbow joint 100. L1 (104) and L2 (102) are lengths measured from the outer sides of the elbow joint 100. D (108) and D2 (106) are diameters of the elbow joint 100's two openings. The angle A (110) is the angle of the elbow joint 100 which, in this case, is 90 degrees. Other types of graphical parameters are possible.

Non-graphical parameters of a part can describe the material(s) the part is made of, the pressure class (e.g., the pounds of water pressure that the part is designed to handle), the location of connection ports, parameters of connection ports, whether the connection ports are threaded, and so on. Other non-graphical part parameters are possible. A connection port is a location on or within the part where the part can be connected to another part. For example, the elbow joint 100 has two connection ports: connection port P1 (112) and connection port P2 (114) indicating the two locations the elbow joint 100 can be connected to compatible parts. A part can be incorporated into a system, machine or a tool, for example. By way of illustration, the elbow joint 100 can be incorporated into a piping system by connecting its connection ports P1 (112) and P2 (114) to other piping parts such as fittings and pipes. A connection port can have an associated type (e.g., male or female), a size (e.g., diameter), an orientation, and so forth. Other connection port parameters are possible.

Figure 2:
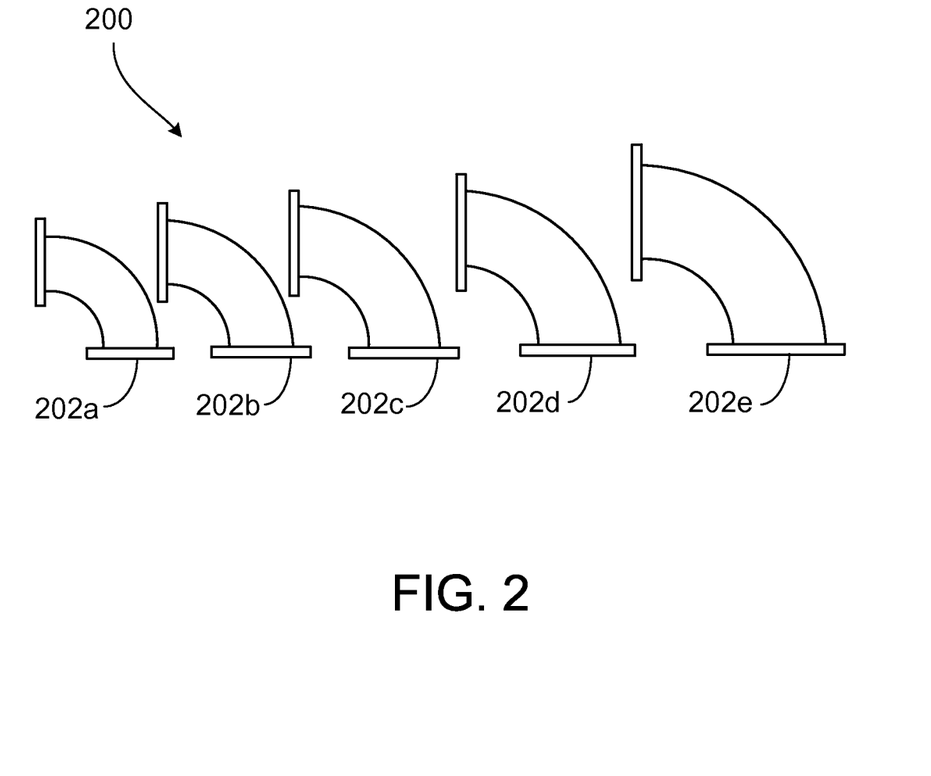
FIG. 2 is an illustration of an example part family.

Parts belong to part families. A part family comprises a set of parts having different sizes but having the same general shape. One or more parameter values can change or remain constant on a per part basis within a part family. FIG. 2 is an illustration of an example part family 200 for the elbow joint 100. The part family 200 is a set of 300 lb. pressure class flanged elbows 202a-e of differing sizes. As can be seen from FIG. 2, the angle A (110) remains the same (i.e., 90 degrees) for each elbow joint in the part family 200, however the other graphical parameters values increase as part sizes progress from small 202a to large 202e. In addition, the connection ports P1 and P2 also change location as the part sizes progress small 202a to large 202e. In some implementations, a part family is represented as a table of parameter values where each row represents the parameter values for a given part in the family. TABLE 1 is an example of a partial part family table for the elbow joins 202a-e of FIG. 2.

TABLE 1

| PART | L1 | L2 | D | D2 | A | CLASS |
|------|------|------|------|------|----|--------|
| 202a | 0.34 | 0.66 | 1.24 | 2.23 | 90 | 300 lb |
| 202b | 0.37 | 0.70 | 1.26 | 2.25 | 90 | 300 lb |
| 202c | 0.39 | 0.74 | 1.28 | 2.27 | 90 | 300 lb |
| 202d | 0.41 | 0.78 | 1.30 | 2.29 | 90 | 300 lb |
| 202e | 0.43 | 0.82 | 1.32 | 2.41 | 90 | 300 lb |

One or more of a part's parameters can serve as parameters for a parametric model of the part. That is, some or all of a part's parameters can be used by a parametric model to generate a solid object corresponding to the part. A parametric model uses parameters to control geometric entities (e.g., Boolean primitives, lines, arcs, filleting operations, and so on) that are used to generate the solid object representation of part. The parameters can include the length, width, height, radius or diameter of an entity, for example, as well as specifying locations of the entities within the model of the solid object.

A parametric model of a part can include one or more constraint equations. A constraint equation is a relationship (e.g., a mathematical relationship) between two or more parameters. A given parameter can be required to have the same value of another, for example, or a given parameter's value can be calculated from the values of one or more other parameters. Other constraints are possible. For example, geometric entities can be constrained relative to each other. A geometric entity can be located at a position in the model relative to (e.g., parallel to, perpendicular to, and so on) the location of another entity, for instance. The parametric model generates a solid object representation of the part that preserves the constraint equations and the constraints among geometric entities.

Figure 3:
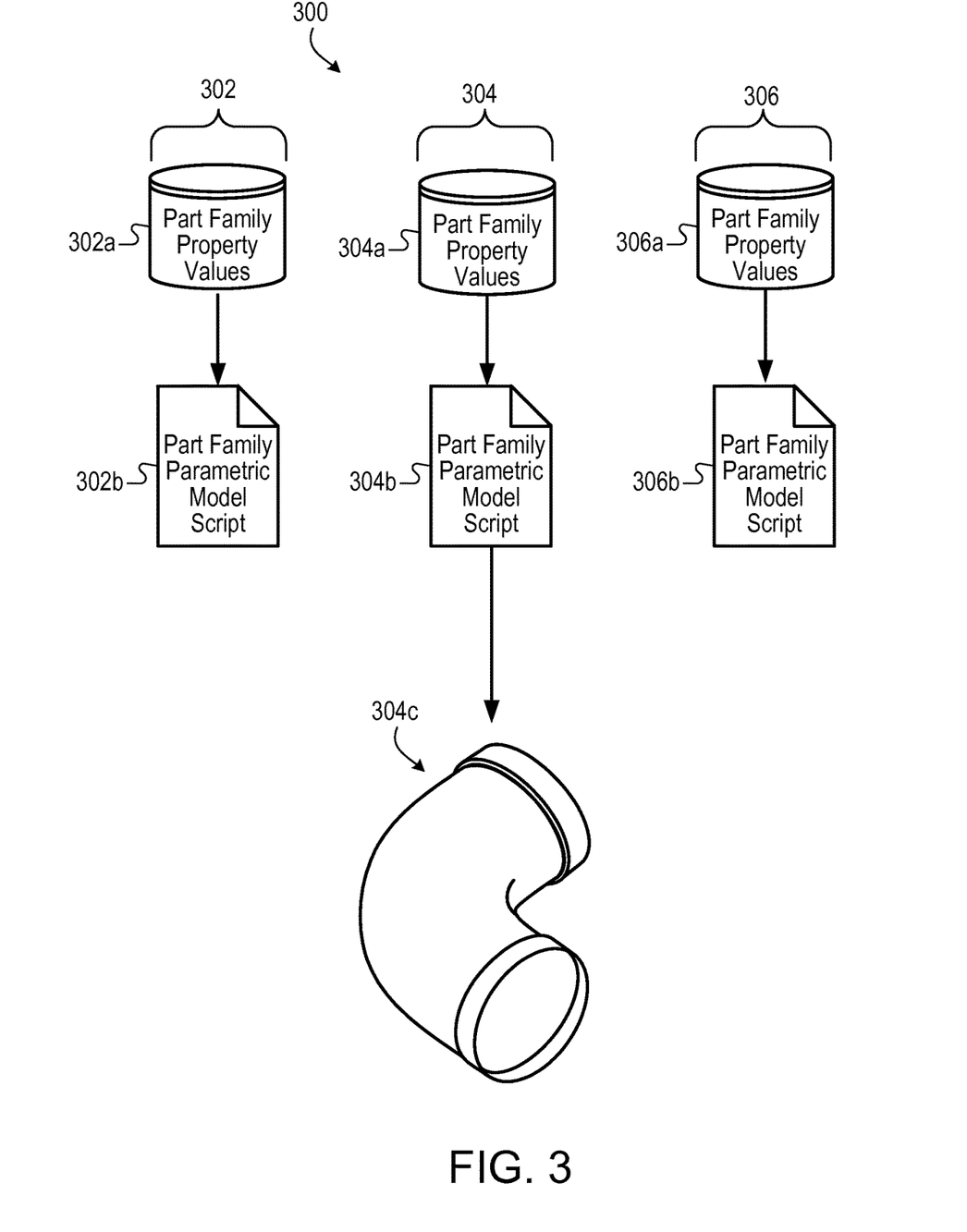
FIG. 3 is an illustration of an example parametric representation of a part family.

FIG. 3 is an illustration of parametric representations 300 of various part families. A parametric representation of a part family includes a parametric template or a parametric shape and sets of parameter values where each set of parameter values describes a part in the part family. When a part is needed, the set of parameter values for the part is provided to the respective parametric model for the part family. The parametric model is then used to generate a solid object of the part using the provided parameter values. FIG. 3 illustrates parametric representations of three part families 302, 304 and 306. Each part family has a set of parameter values (e.g., parameter values 302a, 304a, and 306a) and corresponding parametric models (e.g., parametric models 302b, 304b, and 306b). The parameter values (e.g., 304a) for a part family can be represented as a table of parameter values, for example, as described above in regards to TABLE 1.

In some implementations, a parametric model can be implemented using a script-based parametric framework. Other parametric models are possible. To generate the solid object 304c for a part using a script-based parametric framework, the part family parameter values for that part are obtained from the part family parameter parameters 304a and provided to the parametric model script 304b. The script 304b provides the parameters to functions that use geometric entities to generate the solid object 304c in the CAD system.

In further implementations, part family parameter values from third party CAD systems that utilize the same or a different parametric model can be imported into the present system. A mapping can be defined between each third part parameter value ("source parameter value") and one or more corresponding parameter values for a part family of the present system ("destination parameter value") so that the source parameter values are compatible with the parametric model in the present system. The mapping can be a simple assignment of a value of a source parameter to the value of a destination parameter, or the mapping can involve an expression or a transformation of the source parameter value before it is assigned to the destination parameter value. An expression can comprise one or more mathematical or logical (e.g., Boolean) operations. TABLE 2 is an example mapping of source parameter values L1 and L2 to corresponding destination parameter values Len1 and Len2. The destination parameter value Len1 is assigned the source parameter value of L1 multiplied by 1.2 whereas the destination parameter value Len2 is assigned the value of source parameter value L2.

TABLE 2

| SOURCE PARAMETER NAME | DESTINATION PARAMETER NAME | TRANSFORMATION |
|------|------|------|
| L1 | Len1 | Len1 = L1 × 1.2 |
| L2 | Len2 | Len1 = Len2 |

Figure 4:
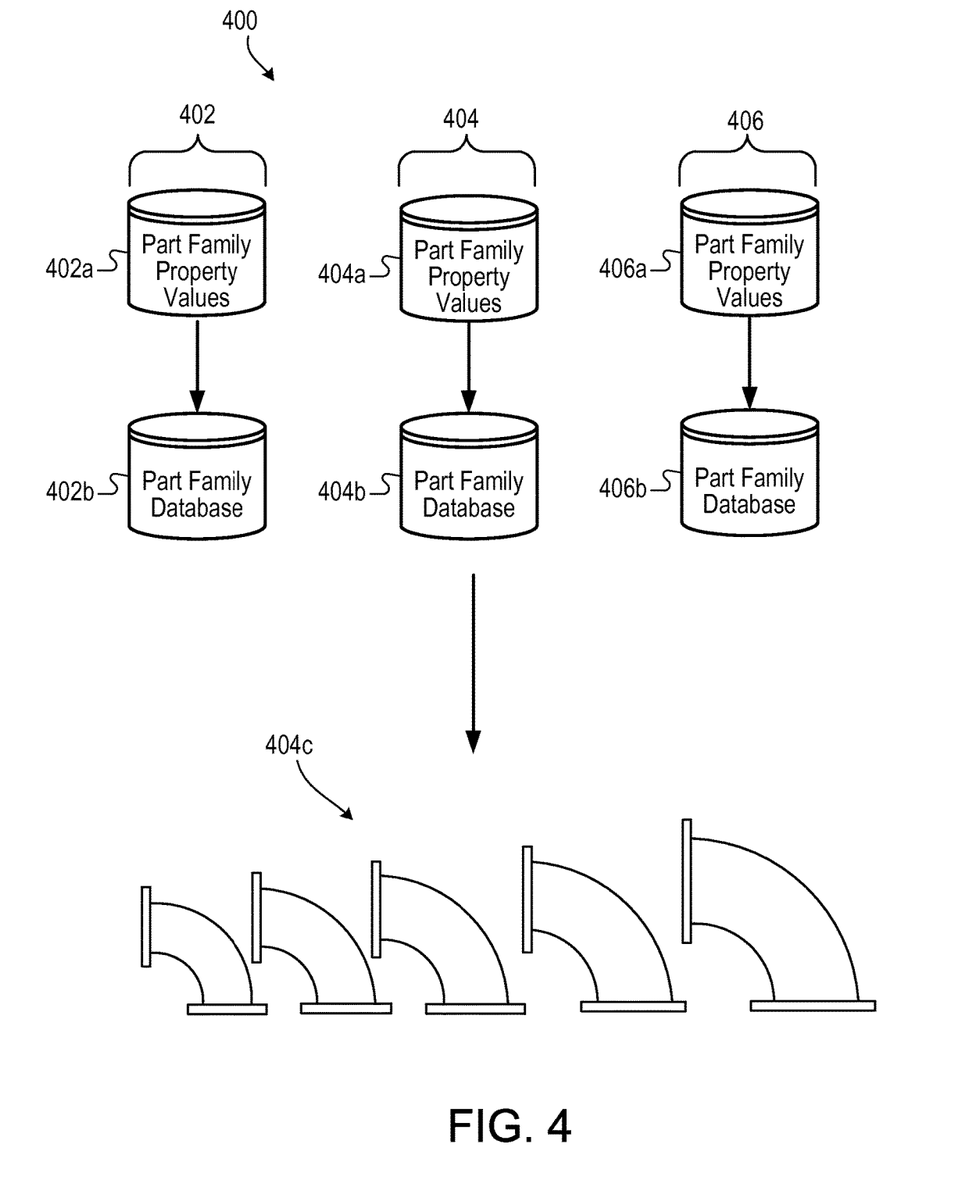
FIG. 4 is an illustration of an example fixed-size representation of a part family.

FIG. 4 is an illustration of fixed-size representations 400 of various part families. Each solid object in the fixed-size representation of a part family is generated by providing parameter values to a parametric model. Once the complete set of solid objects for a part family are generated the parametric model is no longer needed. Any parameter values that are only used by the parametric model can also be discarded. FIG. 4 illustrates fixed-size representations of three part families 402, 404 and 406. Each part family has a set of parameter values (e.g., parameter values 402a, 404a, and 406a) and corresponding part family databases (e.g., databases 402b, 404b, and 406b) which store non-graphical family data and embedded or linked solid object representations for each part. The parameter values (e.g., 404a) for a part family can be represented as a table of parameter values, for example, as described above in regards to TABLE 1. In some implementations, a part family database stores solid models representing parts in a part family as fixed-size blocks in DWG format. The DWG format is an electronic format for storing two dimensional (2-D) and 3-D design data and metadata. All of the parts of a fixed-size representation of a part family can be stored in a single DWG file. Furthermore, connection port locations and directions can be stored in the DWG file itself or can be stored as non-graphical data in a part family database, for example.

Figure 5:
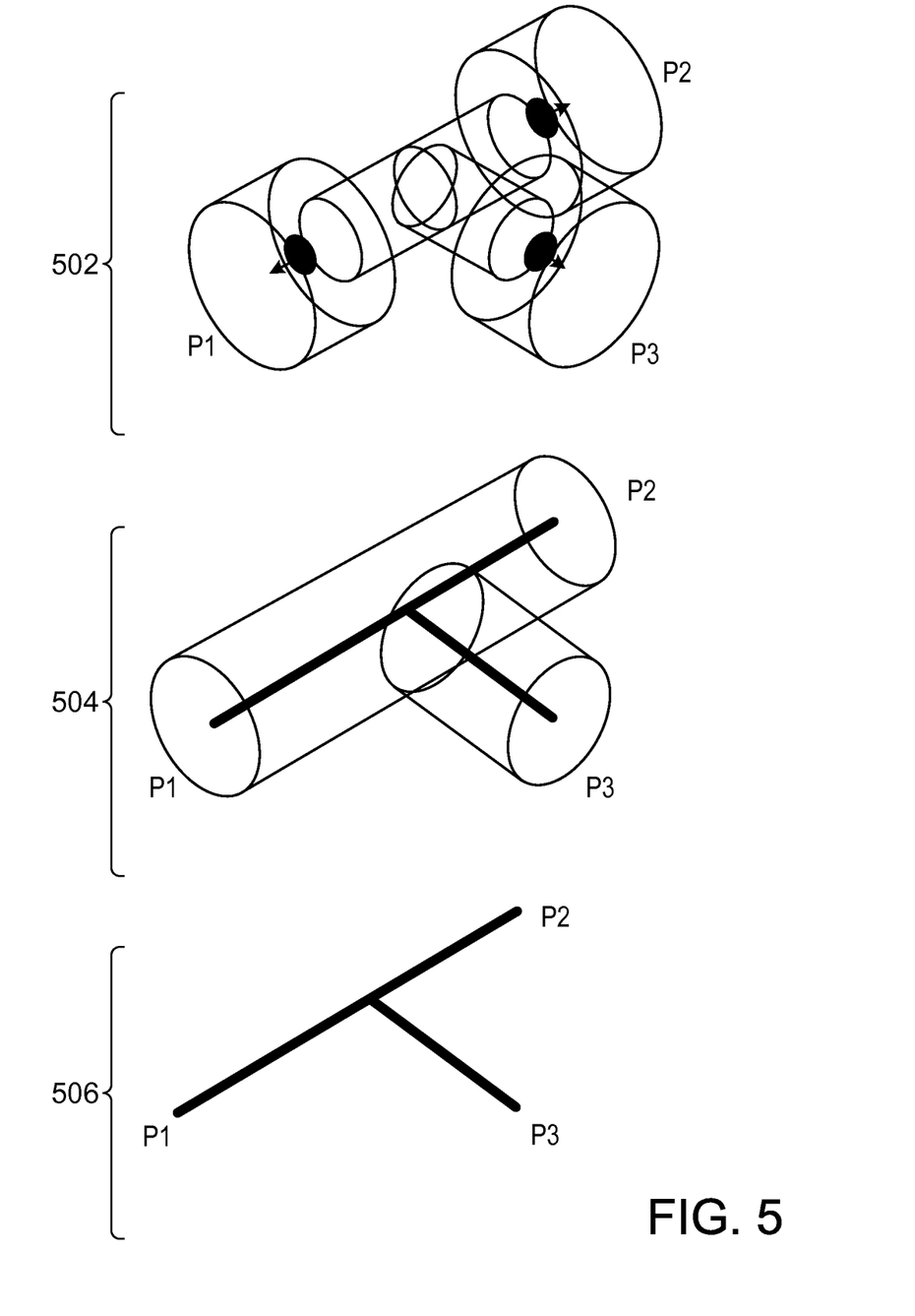
FIG. 5 is an illustration of graphical representations of an example part.

In further implementations, one or more graphical representations of each part in a fixed-size part family representation are generated and accessed via the part family databases. FIG. 5 is an illustration of graphical representations of an example part at different levels of granularity. The graphical representation can be a line representation (e.g., graphical representation 506) in which lines are drawn to between connection ports. The graphical representation can also be a circular sweep representation of varying detail, such as in graphical representations 502 and 504.

Figure 6:
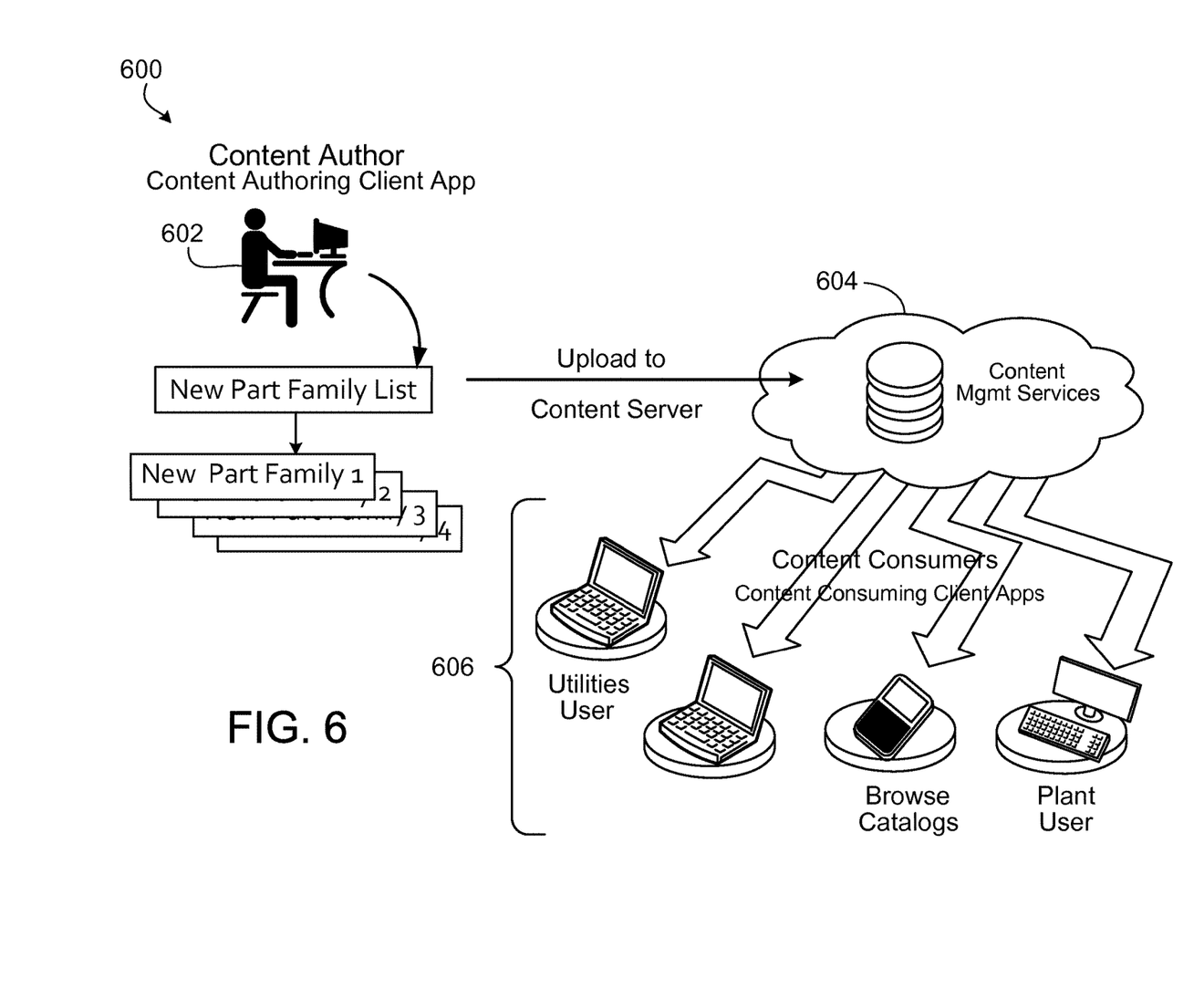
FIG. 6 is an illustration of an example part family system.

FIG. 6 is an illustration of an example part family system 600. The system comprises one or more content servers 604 (e.g., data processing apparatus). The content server 604 allows users (e.g., content author 602) to upload part family definitions and make those definitions accessible to other users (e.g., content consumers 606) as a master part catalog. The content server receives from the content author 602 a definition of a version of a part family comprising a plurality of parts, each part having a same shape and a different respective size, wherein the definition includes a set of parameter values for each part of the part family. For example, the part family definition could utilize a fixed-size or parametric family representation, as described above. In some implementations, the part family definition can be an Extensible Markup Language (XML) document or the definition can be in another format such as comma-separated values or other table-friendly formats. The content server 604 stores the definition along with other versions of the part family in a parametric model-independent format. When a request is received from one of the content consumers 606 for a copy of the part family, the content server 604 converts a latest version of the part family to a format that is compatible with the particular computer-aided design system for which the request is made. The converted part family is then provided to the requesting content consumer 606. In some implementations, the request can specify a natural language for the part family so that descriptions and other information will be provided in that language.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. By way of further illustration, a data processing apparatus can be a touch screen enabled device such as a smart phone or a tablet computer. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by one or more content servers, the method comprising:
   obtaining, by one or more processors of the one or more content servers, a first parametric model of a first part, the first parametric model conforming to a first parametric modeling framework, and the first parametric model comprising a plurality of first parameters and one or more first constraints between pairs of the first parameters;
   generating, by one or more processors of the one or more content servers, a first part family representation from the first parametric model of the first part, the first part family representation including a plurality of parts each having a same shape and a different respective size, for each part in the first part family representation, wherein the generated first part family representation is in a parametric model-independent format, which does not include a parametric model with parameters and constraints between pairs of parameters;

importing, by one or more processors of the one or more content servers, a second parametric model of a second part, the second parametric model conforming to a second parametric modeling framework, which is different than the first parametric modelling framework, and the second parametric model comprising a plurality of second parameters and one or more second constraints between pairs of the second parameters;

generating, by one or more processors of the one or more content servers, a second part family representation from the second parametric model of the second part, the second part family representation including a plurality of parts each having a same shape and a different respective size, for each part in the second part family representation, wherein the generated second part family representation is in the parametric model-independent format, which does not include a parametric model with parameters and constraints between pairs of parameters;

making, by one or more processors of the one or more content servers, both the first part family representation in the parametric model-independent format and the second part family representation in the parametric model-independent format available to a client device having a particular computer-aided design system;

receiving, by one or more processors of the one or more content servers, a first request from the client device for the first part family;

converting, by one or more processors of the one or more content servers, the first part family to a format that is compatible with the particular computer-aided design system of the client device;

providing, by one or more processors of the one or more content servers, the converted first part family to the client device in response to the first request;

receiving, by one or more processors of the one or more content servers, a second request from the client device for the second part family;

converting, by one or more processors of the one or more content servers, the second part family to the format that is compatible with the particular computer-aided design system of the client device; and providing, by one or more processors of the one or more content servers, the converted second part family to the client device in response to the second request;

wherein generating the second part family representation from the second parametric model of the second part comprises mapping properties of the second parametric modeling framework to properties of the first parametric modeling framework, and creating the second part family representation of the second part using the first parametric modelling framework in accordance with the mapped properties;

wherein each of the first part family representation and the second part family representation is a fixed-size representation comprising fixed-size solid objects and non-graphical family data; and wherein each fixed-size representation of a part family further comprises a static graphic representation showing connection port locations for the part family.

2. The method of claim 1, wherein each fixed-size representation of a part family is stored in a part family database, which stores solid models representing parts in the part family as fixed-size blocks in an electronic format for storing two dimensional and three dimensional design data and metadata.

3. The method of claim 1, wherein each fixed-size representation of a part family is stored in a single file in an electronic format for storing two dimensional and three dimensional design data and metadata.

4. The method of claim 1, wherein each fixed-size representation of a part family comprises a plurality of static graphic representations showing the connection port locations for the part family, and each of the plurality of static graphic representations shows a same view of the part family with different levels of granularity.

5. The method of claim 4, wherein the different levels of granularity comprise a line representation and a circular sweep representation.

6. A system comprising:

one or more content servers comprising one or more processors; and a non-transitory storage medium coupled with the one or more content servers and having instructions stored thereon, wherein the one or more processors are configured to perform the instructions to effect operations comprising:

obtaining, by the one or more content servers, a first parametric model of a first part, the first parametric model conforming to a first parametric modeling framework, and the first parametric model comprising a plurality of first parameters and one or more first constraints between pairs of the first parameters;

generating, by the one or more content servers, a first part family representation from the first parametric model of the first part, the first part family representation including a plurality of parts each having a same shape and a different respective size, for each part in the first part family representation, wherein the generated first part family representation is in a parametric model-independent format, which does not include a parametric model with parameters and constraints between pairs of parameters;

importing, by the one or more content servers, a second parametric model of a second part, the second parametric model conforming to a second parametric modeling framework, which is different than the first parametric modelling framework, and the second parametric model comprising a plurality of second parameters and one or more second constraints between pairs of the second parameters;

generating, by the one or more content servers, a second part family representation from the second parametric model of the second part, the second part family representation including a plurality of parts each having a same shape and a different respective size, for each part in the second part family representation, wherein the generated second part family representation is in the parametric model-independent format, which does not include a parametric model with parameters and constraints between pairs of parameters;

making, by the one or more content servers, both the first part family representation in the parametric model-independent format and the second part family representation in the parametric model-independent format available to a client device having a particular computer-aided design system;

receiving, by the one or more content servers, a first request from the client device for the first part family;

converting, by the one or more content servers, the first part family to a format that is compatible with the particular computer-aided design system of the client device;

providing, by the one or more content servers, the converted first part family to the client device in response to the first request;

receiving, by the one or more content servers, a second request from the client device for the second part family;

converting, by the one or more content servers, the second part family to the format that is compatible with the particular computer-aided design system of the client device; and providing, by the one or more content servers, the converted second part family to the client device in response to the second request;

wherein generating the second part family representation from the second parametric model of the second part comprises mapping properties of the second parametric modeling framework to properties of the first parametric modeling framework, and creating the second part family representation of the second part using the first parametric modelling framework in accordance with the mapped properties;

wherein each of the first part family representation and the second part family representation is a fixed-size representation comprising fixed-size solid objects and non-graphical family data; and wherein each fixed-size representation of a part family further comprises a static graphic representation showing connection port locations for the part family.

7. The system of claim 6, wherein each fixed-size representation of a part family is stored in a part family database, which stores solid models representing parts in the part family as fixed-size blocks in an electronic format for storing two dimensional and three dimensional design data and metadata.

8. The system of claim 6, wherein each fixed-size representation of a part family is stored in a single file in an electronic format for storing two dimensional and three dimensional design data and metadata.

9. The system of claim 6, wherein each fixed-size representation of a part family comprises a plurality of static graphic representations showing the connection port locations for the part family, and each of the plurality of static graphic representations shows a same view of the part family with different levels of granularity.

10. The system of claim 9, wherein the different levels of granularity comprise a line representation and a circular sweep representation.

11. A non-transitory storage medium having instructions stored thereon which, when performed by one or more processors of one or more content servers, effect operations comprising:

obtaining, by the one or more content servers, a first parametric model of a first part, the first parametric model conforming to a first parametric modeling framework, and the first parametric model comprising a plurality of first parameters and one or more first constraints between pairs of the first parameters;

generating, by the one or more content servers, a first part family representation from the first parametric model of the first part, the first part family representation including a plurality of parts each having a same shape and a different respective size, for each part in the first part family representation, wherein the generated first part family representation is in a parametric model-independent format, which does not include a parametric model with parameters and constraints between pairs of parameters;

importing, by the one or more content servers, a second parametric model of a second part, the second parametric model conforming to a second parametric modeling framework, which is different than the first parametric modelling framework, and the second parametric model comprising a plurality of second parameters and one or more second constraints between pairs of the second parameters;

generating, by the one or more content servers, a second part family representation from the second parametric model of the second part, the second part family representation including a plurality of parts each having a same shape and a different respective size, for each part in the second part family representation, wherein the generated second part family representation is in the parametric model-independent format, which does not include a parametric model with parameters and constraints between pairs of parameters;

making, by the one or more content servers, both the first part family representation in the parametric model-independent format and the second part family representation in the parametric model-independent format available to a client device having a particular computer-aided design system;

receiving, by the one or more content servers, a first request from the client device for the first part family;

converting, by the one or more content servers, the first part family to a format that is compatible with the particular computer-aided design system of the client device;

providing, by the one or more content servers, the converted first part family to the client device in response to the first request;

receiving, by the one or more content servers, a second request from the client device for the second part family;

converting, by the one or more content servers, the second part family to the format that is compatible with the particular computer-aided design system of the client device; and providing, by the one or more content servers, the converted second part family to the client device in response to the second request;

wherein generating the second part family representation from the second parametric model of the second part comprises mapping properties of the second parametric modeling framework to properties of the first parametric modeling framework, and creating the second part family representation of the second part using the first parametric modelling framework in accordance with the mapped properties;

wherein each of the first part family representation and the second part family representation is a fixed-size representation comprising fixed-size solid objects and non-graphical family data; and wherein each fixed-size representation of a part family further comprises a static graphic representation showing connection port locations for the part family.

12. The non-transitory storage medium of claim 11, wherein each fixed-size representation of a part family is stored in a part family database, which stores solid models representing parts in the part family as fixed-size blocks in an electronic format for storing two dimensional and three dimensional design data and metadata.

13. The non-transitory storage medium of claim 11, wherein each fixed-size representation of a part family is stored in a single file in an electronic format for storing two dimensional and three dimensional design data and metadata.

14. The non-transitory storage medium of claim 11, wherein each fixed-size representation of a part family comprises a plurality of static graphic representations showing the connection port locations for the part family, and each of the plurality of static graphic representations shows a same view of the part family with different levels of granularity.

15. The non-transitory storage medium of claim 14, wherein the different levels of granularity comprise a line representation and a circular sweep representation.

* * * * *

UNITED STATES PATENT AND TRADEMARK OFFICE
CERTIFICATE OF CORRECTION

PATENT NO. : 9,639,655 B2  
APPLICATION NO. : 13/433176  
DATED : May 2, 2017  
INVENTOR(S) : Craig Storms et al.

Page 1 of 1

It is certified that error appears in the above-identified patent and that said Letters Patent is hereby corrected as shown below:

On the Title Page

Column 1, (75) Inventors, seventh inventor: Delete "Damian Wilcox" and insert --Damian Willcox--, therefor.

Signed and Sealed this
First Day of May, 2018

Andrei Iancu
*Director of the United States Patent and Trademark Office*